US009390663B2

(12) United States Patent
Schutten et al.

(10) Patent No.: US 9,390,663 B2
(45) Date of Patent: Jul. 12, 2016

(54) LIQUID CRYSTAL DISPLAY OVERDRIVE INTERPOLATION CIRCUIT AND METHOD

(71) Applicant: Nvidia Corporation, Santa Clara, CA (US)

(72) Inventors: Robert Schutten, Santa Clara, CA (US); Tom Verbeure, Santa Clara, CA (US); Rudi Bloks, Santa Clara, CA (US)

(73) Assignee: Nvidia Corporation, Santa Clara, CA (US)

(*) Notice: Subject to any disclaimer, the term of this patent is extended or adjusted under 35 U.S.C. 154(b) by 113 days.

(21) Appl. No.: 14/175,159

(22) Filed: Feb. 7, 2014

(65) Prior Publication Data

US 2015/0228055 A1 Aug. 13, 2015

(51) Int. Cl.

| | |
|---|---|
| ***G09G 5/02*** | (2006.01) |
| ***G09G 3/36*** | (2006.01) |
| ***G09G 5/39*** | (2006.01) |
| ***G06T 11/00*** | (2006.01) |
| ***G06T 3/40*** | (2006.01) |
| ***G09G 5/395*** | (2006.01) |

(52) U.S. Cl.

CPC .................. *G09G 3/36* (2013.01); *G09G 5/395* (2013.01); *G09G 2320/0252* (2013.01); *G09G 2320/0257* (2013.01); *G09G 2320/0261* (2013.01); *G09G 2340/16* (2013.01)

(58) Field of Classification Search

CPC combination set(s) only.

See application file for complete search history.

(56) References Cited

U.S. PATENT DOCUMENTS

| | | | | |
|---|---|---|---|---|
| 6,133,957 | A * | 10/2000 | Campbell | G06T 3/403 348/441 |
| 7,382,349 | B1 * | 6/2008 | Kuhns | 345/102 |
| 9,041,750 | B2 * | 5/2015 | Dai et al. | 345/690 |
| 2002/0030690 | A1 * | 3/2002 | Someya | G06T 5/20 345/598 |
| 2003/0072016 | A1 * | 4/2003 | Dalrymple et al. | 358/1.9 |
| 2006/0267893 | A1 * | 11/2006 | Kim et al. | 345/89 |
| 2010/0110240 | A1 * | 5/2010 | Thebault | H04N 5/3675 348/246 |
| 2012/0147162 | A1 * | 6/2012 | Park et al. | 348/60 |
| 2014/0300650 | A1 * | 10/2014 | Dai et al. | 345/690 |

FOREIGN PATENT DOCUMENTS

| | | | |
|---|---|---|---|
| CN | 101425267 | * 10/2011 | G09G 3/36 |

* cited by examiner

*Primary Examiner* — Wesner Sajous

(57) ABSTRACT

A liquid crystal display (LCD) overdrive interpolation circuit and method, and an LCD drive system incorporating the circuit or method. In one embodiment, the circuit includes: (1) a diagonal interpolator operable to perform a diagonal interpolation along a diagonal direction in a lookup table based on TO and FROM gray levels and (2) a further interpolator coupled to the diagonal interpolator and operable to perform a further interpolation based on a result of the diagonal interpolation and the FROM gray level.

13 Claims, 4 Drawing Sheets

LIQUID CRYSTAL DISPLAY OVERDRIVE INTERPOLATION CIRCUIT AND METHOD

TECHNICAL FIELD

This application is directed, in general, to liquid crystal display (LCD) drive circuitry and, more specifically, to a circuit and method for overdriving an LCD with correctly interpolated values.

BACKGROUND

Common thin-film transistor (TFT) LCD varieties, including twisted nematic (TN), in-plane switching (IPS) and patterned vertical alignment (PVA), have a relatively slow intermediate gray scale response (e.g., as a pixel transitions from one gray level, or GL, to another) due to fundamental characteristics of the LCD structure constituting the pixels of the display. This slow response gives rise to poor dynamic contrast for motion video, resulting in display artifacts commonly known as "ghosting," "blurring" and "streaking." The best current solution to slow LCD response is response time compensation (RTC), often called "overdrive." Overdrive compensates for slow intermediate gray scale response (so-called gray-to-gray, or GtG, transitions) by adjusting the gray scale values used to drive the LCD to achieve desired final values.

For example, it is not possible with current LCDs to drive a pixel from GL 20 to GL 180 in 8 ms. However, by initially driving the pixel from GL 20 toward GL 200 and then to GL 180 after a short delay, it is possible to achieve such a GtG transition in 8 ms.

LCDs typically use FROM-TO lookup tables (LUTs) to implement overdrive. A FROM-TO LUT takes the form of an N×N table that indicates the GL to which a pixel should be driven when going from one GL to another GL. However, a FROM-TO LUT that includes entries for every possible FROM and TO GL (e.g., 0 to 255) would be needlessly large. Instead, a typical FROM-TO LUT may be 17×17 and contain FROM-TO entries for 0 and 255 and multiples of 16 between the two, i.e. 0, 16, 32, . . . , 255. Interpolation is required for the remaining FROM and TO GLs that are not entered in the LUT. Bi-linear interpolation is used for this purpose and requires the four LUT entries corresponding to the closest GLs both less than or equal to and greater than both the FROM and TO GL.

SUMMARY

One aspect provides an LCD overdrive interpolation circuit. In one embodiment, the circuit includes: (1) a diagonal interpolator operable to perform a diagonal interpolation along a diagonal direction in a lookup table based on TO and FROM GLs and (2) a further interpolator coupled to the diagonal interpolator and operable to perform a further interpolation based on a result of the diagonal interpolation and the FROM GL.

Another aspect provides an LCD overdrive interpolation method. In one embodiment, the method includes: (1) performing a diagonal interpolation along a diagonal direction in a lookup table, (2) performing a further interpolation based on a result of the diagonal interpolation and (3) employing a result of the further interpolation to overdrive the liquid crystal display.

Yet another aspect provides an LCD drive system. In one embodiment, the LCD drive system includes: (1) a graphics subsystem having a graphics processing unit and a frame buffer coupled thereto operable to store a TO GL, (2) a previous frame buffer operable to store a FROM GL and (3) an interpolation circuit coupled to the frame buffer and the previous frame buffer and having: (3a) a diagonal interpolator operable to perform a diagonal interpolation along a diagonal direction in a lookup table based on the TO and FROM GLs and (3b) a further interpolator coupled to the diagonal interpolator and operable to perform a further interpolation based on a result of the diagonal interpolation and the FROM GL.

BRIEF DESCRIPTION

Reference is now made to the following descriptions taken in conjunction with the accompanying drawings, in which.

DETAILED DESCRIPTION

Figure 1A:
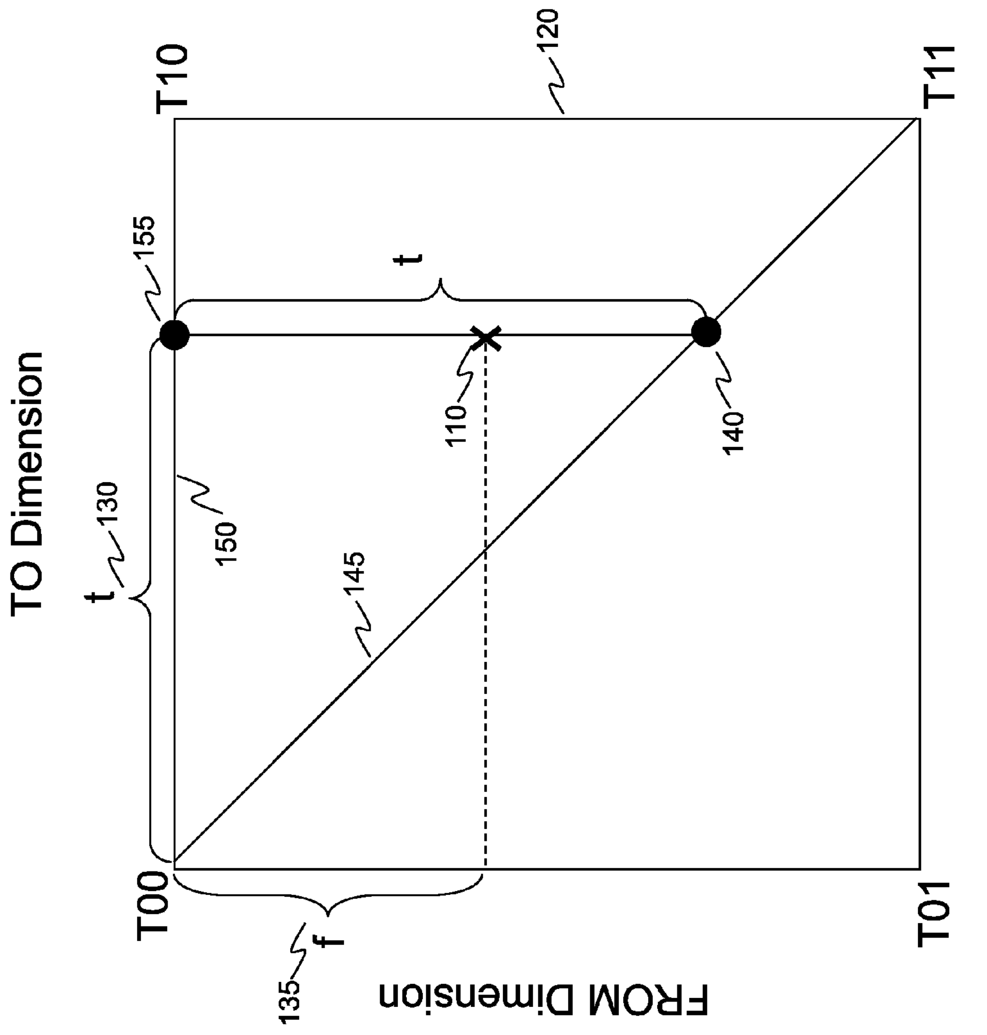
FIGS. 1A and 1B are graphs illustrating a novel interpolation technique that guarantees equality among an interpolated final GL and the FROM and TO GLs corresponding thereto, when the interpolation target is above (FIG. 1A) or below (FIG. 1B) the diagonal.

In the description below, the GL to which the pixel is overdriven is referred to as the final GL, as it is the final result of the interpolation process. As stated above, bi-linear interpolation is conventionally used for the purpose of calculating the final GL for FROM and TO GLs that are not explicitly entered in the FROM-TO LUT. However, it is realized herein that a challenge arises when the FROM GL equals the TO GL, namely that the GL to which the pixel is driven should be equal to both the FROM and TO GLs. After all, a pixel is at a steady state when the FROM GL is the same as the TO GL, and overdriving is unnecessary.

While explicit FROM-TO LUT entries lying along the diagonal, e.g., (0,0), (16,16), (32,32), are the same as the FROM and TO GLs to which they correspond, it is realized herein that bi-linear interpolation between LUT entries along the diagonal often results in GLs that differ from the FROM and TO GLs to which they correspond. Consequently, static images displayed on an LCD can have an incorrect color for pixels that are interpolated.

A stopgap measure to combat this issue is to provide a threshold function that forces the TO GL to be used in lieu of the interpolated value when the FROM and TO GLs are within a threshold value of each other. Unfortunately, while the threshold function settles static images, it introduces a discontinuity into what should instead be a monotonically changing overdrive function, and adversely affects dynamic images. The discontinuity may be subtle when overdrive is modest (e.g., for monoscopic video), but more pronounced and annoying when overdrive is aggressive (e.g., for sequential stereoscopic video).

It is realized herein that an interpolation technique superior to bi-linear interpolation is needed. Moreover, it is realized that the novel interpolation technique should guarantee that if the FROM and TO GLs are the same, then the overdrive GL equals the FROM and TO values as well. It is specifically realized that an interpolation technique having a unity function along the diagonal mathematically guarantees such an overdrive GL.

Accordingly, introduced herein are various embodiments of a circuit and method for LCD overdrive interpolation. The embodied interpolation is carried out in three steps. A diagonal interpolation is initially carried out along a diagonal of a rectangle. Next, a further interpolation is carried out along a horizontal side of the rectangle. Finally, another interpolation is conducted using results from the diagonal and further interpolations. The further and other interpolations follow different formulas depending on whether the interpolation target is above the diagonal or not.

This is mathematically different from bi-linear interpolation, in which interpolation is initially carried out along opposing edges of a rectangle and then between the two resulting interpolated values. The difference is significant, because bi-linear interpolation fails to guarantee equality of the final GL result with the FROM and TO GL inputs.

The novel interpolation is described below using an exemplary embodiment, wherein FROM and TO GL values are between 0 and 255, inclusive, and final GL values are stored in a 17×17 LUT corresponding to FROM and TO GL values of 0, 16, 32, . . . , and 256. The example further assumes that calculations are conducted in floating point precision and that in the LUT, horizontal and vertical axes are the TO and FROM dimensions, respectively.

To interpolate a final GL value for a target (i.e. a pair of target TO and FROM values), the appropriate interpolation rectangle in the LUT is first identified. The interpolation rectangle is the smallest rectangle the vertices of which are four LUT points bracketing the target TO and FROM values. If the target TO value is equal to a LUT value, the rectangle is chosen such that the larger of the two LUT TO values is strictly larger than the target, implying that the smaller LUT value may be equal to the target. The same approach is used if a target FROM value is equal to a LUT FROM value.

FIG. 1A is a graph illustrating am embodiment of the novel interpolation technique that guarantees equality among an interpolated final GL and the FROM and TO GLs corresponding thereto, when the interpolation target is above the diagonal. The interpolation target point 110 is bracketed by the interpolation rectangle 120. Final GL values stored in the LUT are referred to as Txy, where x=0 and 1 for the smaller and larger bracketing TO GL values, respectively, and y=0 or 1 for the smaller and larger bracketing FROM GL values, respectively. In the illustrated embodiment, fractions t 130 and f 135 are calculated as follows:

$$t=(\text{TO mod } 16)/16.0, \text{ and}$$

$$f=(\text{FROM mod } 16)/16.0.$$

The fractions t 130 and f 135 indicate the local position of the interpolation target point 110 inside the interpolation rectangle 120.

A diagonal interpolation is conducted to find D, the interpolated value at the point 140 on the diagonal line 145, according to:

$$D=T00+t*(T11-T00).$$

As described below, the diagonal interpolation is conducted whether the interpolation target 110 is below or above the diagonal line 145. In FIG. 1A, t>f, indicating that the interpolation target 110 is above the diagonal line 145.

In addition, a horizontal interpolation is conducted along the top horizontal line 150 to find H, the interpolated value at the point 155:

$$H=T00+t*(T10-T00).$$

A final interpolation is then conducted to find the final GL value F, using the earlier results D and H:

$$F=H+(D-H)*f/t.$$

Figure 1B:
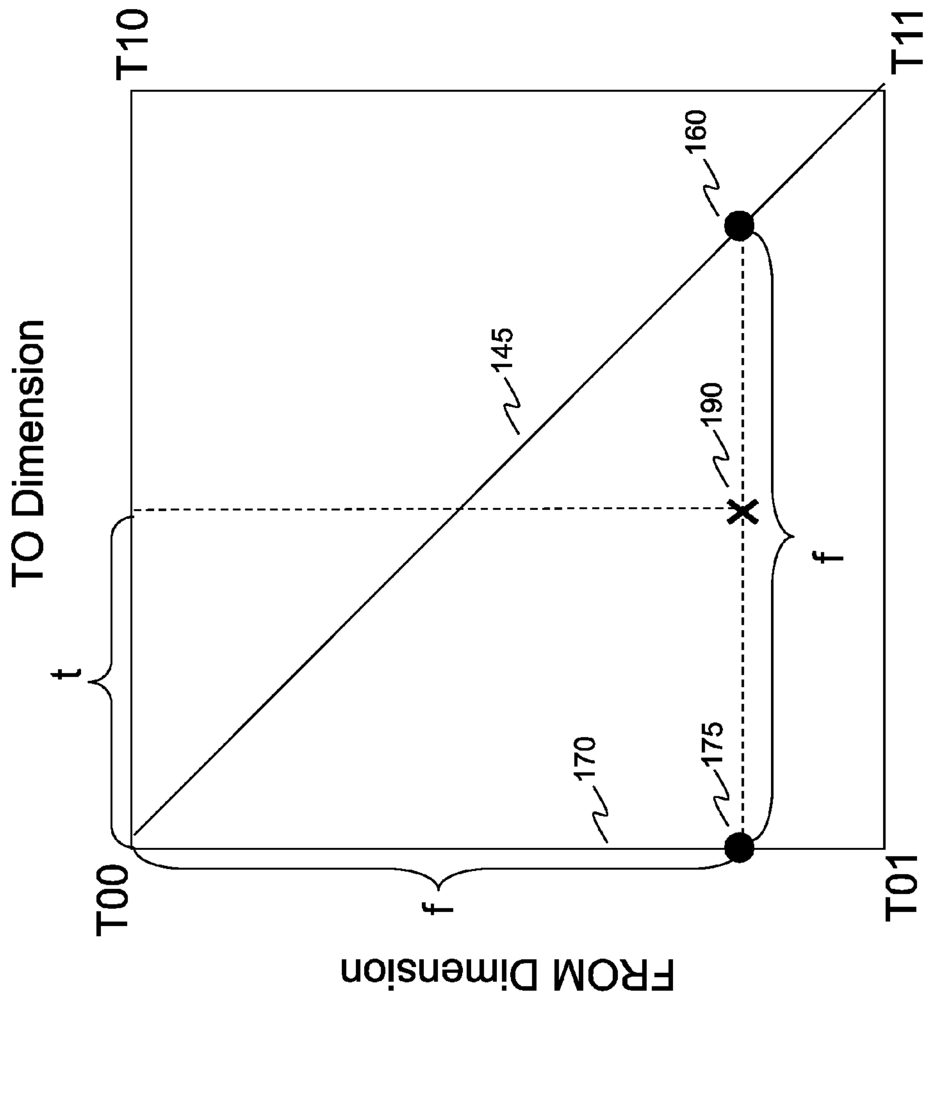

FIG. 1B is a graph illustrating an embodiment of the novel interpolation technique, when the interpolation target is not above the diagonal, i.e. when t≤f. As before, a diagonal interpolation is conducted to find D, the interpolated value at the point 160 on the diagonal line 145:

$$D=T00+f*(T11-T00).$$

In addition, a vertical interpolation is conducted along the vertical line 170 to find V, the interpolated value at the point 175:

$$V=T00+f*(T01-T00).$$

A final interpolation is then conducted to find the final GL value F at the target interpolation point 190, using the earlier results D and V:

$$F=V+(D-V)*t/f.$$

Figure 2:
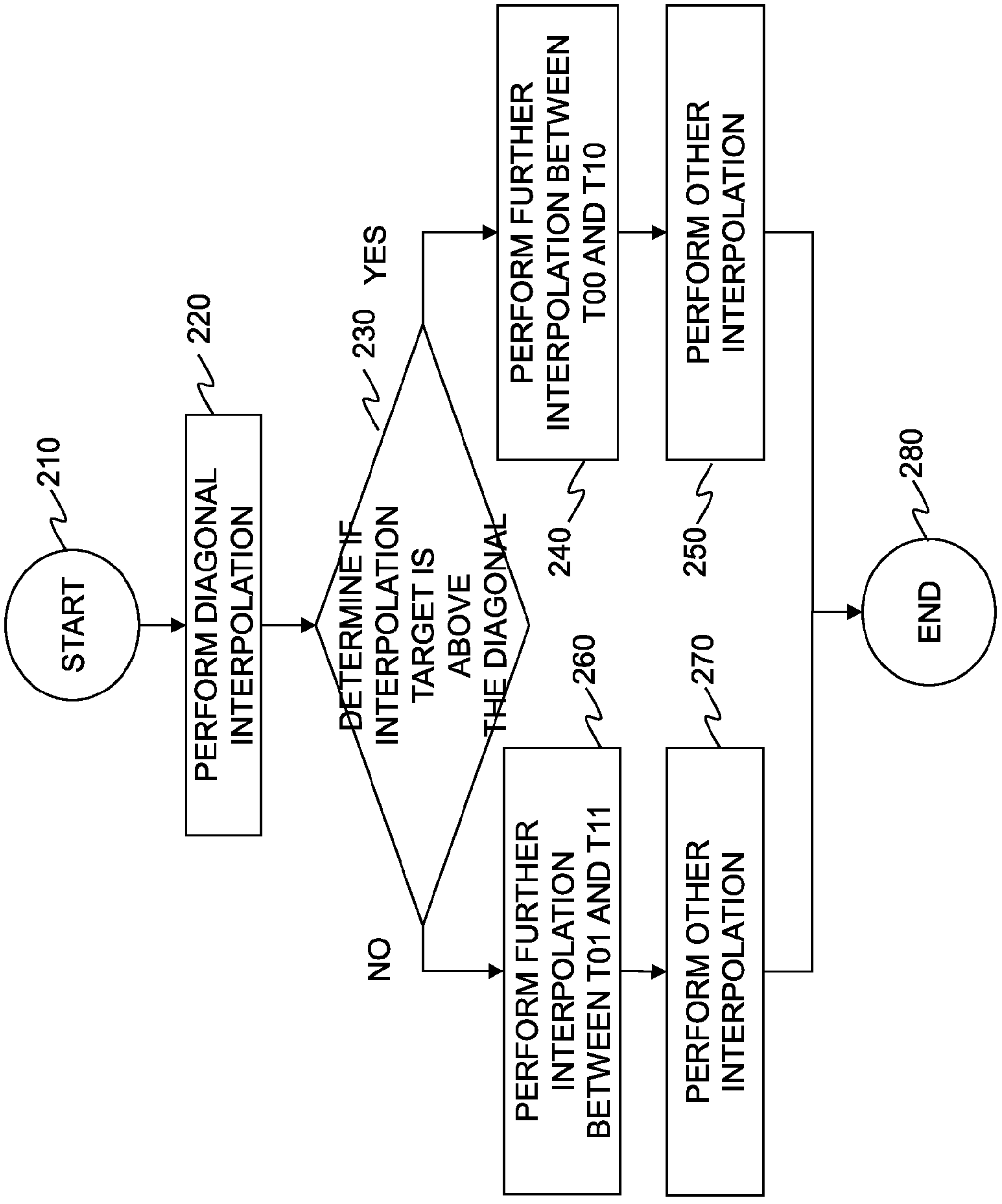
FIG. 2 is a flow diagram of one embodiment of a method of interpolating a final GL using entries taken from a FROM-TO LUT.

FIG. 2 is a flow diagram of one embodiment of a method of interpolating a final GL using entries taken from a FROM-TO LUT. The method begins in a start step 210. In a step 220, a diagonal interpolation is performed. In a decisional step 230, a determination is made if the interpolation target point is above the diagonal or not; if so, steps 240, 250 are performed, and if not, steps 260, 270 are performed. In the step 240, a further (e.g., horizontal) interpolation is performed between LUT points T00 and T10. In the step 250, another (e.g., final) interpolation is performed.

In the step 260, a further (e.g., vertical) interpolation is performed between LUT points T01 and T11.

In the step 270, another (e.g., final) interpolation is performed. The method ends in an end step 280.

Disclosed embodiments are advantageous over bi-linear interpolation. These embodiments guarantee the equality of the final GL with the TO and FROM GLs. In addition, discontinuities in the final GL for TO and FROM GLs off the diagonal are avoided.

Figure 3:
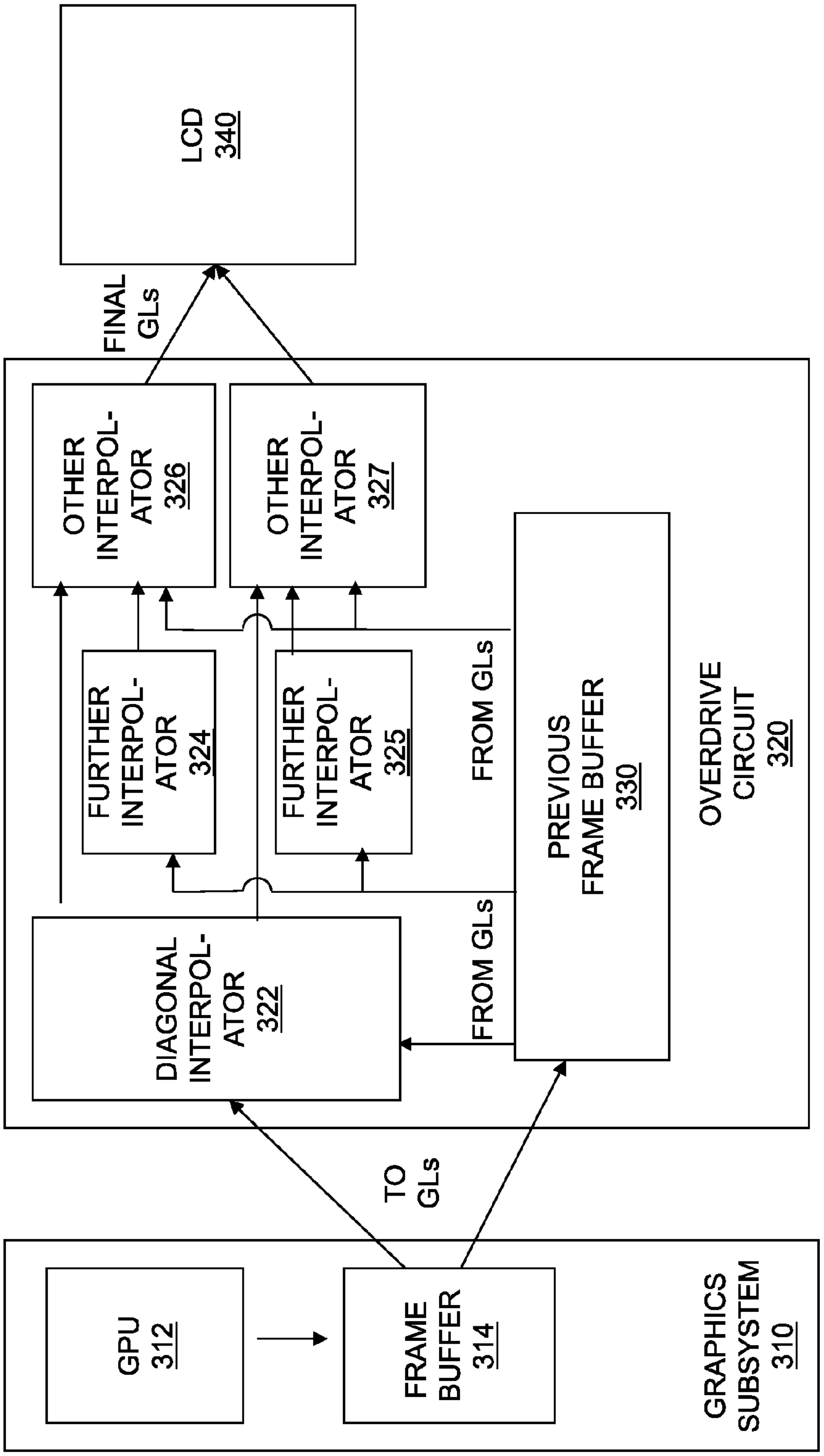
FIG. 3 is a block diagram of an embodiment of an LCD drive system.

FIG. 3 is a block diagram of an embodiment of an LCD drive system. A graphics subsystem 310 contains a GPU 312 driving a frame buffer 314. An overdrive circuit 320 includes a previous frame buffer 330, a diagonal interpolator 322, further interpolators 324, 325, and other interpolators 326, 327. The frame buffer 314 provides TO GLs for storage in previous frame buffer 330. The diagonal interpolator 322 receives TO and FROM GLs from the frame buffer 314 and the previous frame buffer 330, and performs diagonal interpolation regardless of the position of the interpolation target point with respect to the diagonal. If the interpolation target point lies above the diagonal, the interpolators 324, 326 perform their respective interpolations based on TO and FROM GLs received from the frame buffer 314 and the previous frame buffer 330, and the result from the diagonal interpolator 322. Likewise, if the interpolation target point does not lie above the diagonal, the interpolators 325, 327 perform their respective interpolations based on TO and FROM GLs received from the frame buffer 314 and the previous frame buffer 330, and the result from the diagonal interpolator 322. The final GLs are used as overdrive targets for the LCD 340.

In other embodiments, the diagonal interpolation is conducted either before or after determining whether or not the interpolation target point lies above the diagonal. Furthermore, two or more steps may be combined into a single formula and carried out in a single step. Also, the embodied interpolation method may be used only when the interpolation target is near the LUT diagonal, for example when the interpolation target is inside a LUT bin through which the LUT diagonal passes. In yet other embodiments, the further interpolations may be both horizontal and the other interpolations may be both vertical, the further interpolations may be both vertical and the other interpolations may be both horizontal, the further interpolation and the other interpolation may be horizontal if the interpolation target point is below the diagonal and vertical if the interpolation target point is above the diagonal.

In one alternative embodiment, any division operations required in the interpolation are replaced by multiplication by considering only a limited number of the top bits of the t fraction and using the result as an index into a multiplication table. Since overdrive tables are by nature imprecise, some precision can be sacrificed for efficiency. Simulations indicate that using only the top three bits of the t fraction produces results that are still much superior to bi-linear interpolation. This is particularly advantageous since some commercial field-programmable gate arrays (FPGAs) support eight-entry coefficient tables in their digital signal processor (DSP) multipliers and can be used for this purpose.

One alternative embodiment employs fixed-precision logic to carry out interpolation, with the understanding that diagonal entries will likely be imprecise. In such an embodiment, it may be advantageous to include logic to guarantee desired values for elements along the diagonal.

Those skilled in the art to which this application relates will appreciate that other and further additions, deletions, substitutions and modifications may be made to the described embodiments.

What is claimed is:

1. A liquid crystal display overdrive interpolation circuit, comprising:

a diagonal interpolator operable to perform a diagonal interpolation along a diagonal direction in a lookup table based on TO and FROM gray levels; and a further interpolator coupled to said diagonal interpolator and operable to perform a further interpolation based on a result of said diagonal interpolation and said FROM gray level.

2. The overdrive interpolation circuit as recited in claim 1 further comprising another interpolator coupled to said diagonal and further interpolators and operable to perform another interpolation along a first orthogonal direction of said lookup table.

3. The overdrive interpolation circuit as recited in claim 2 wherein said further interpolation is an interpolation along a second orthogonal direction of said lookup table based on results of said diagonal and another interpolations, said second orthogonal direction being normal to said first orthogonal direction.

4. The overdrive interpolation circuit as recited in claim 3 wherein said another interpolation uses an entry in said lookup table not on a diagonal of said lookup table and on a same side of said diagonal as an interpolation target.

5. The overdrive interpolation circuit as recited in claim 4 wherein said further and other interpolators are further operable to approximate any division operations by multiplication based on three most significant bits of a division fraction as an index into a multiplication table.

6. A method for overdriving a liquid crystal display, said method comprising:

performing, by a liquid crystal display overdrive interpolation circuit coupled to said liquid crystal display, a diagonal interpolation along a diagonal direction in a lookup table;

performing another interpolation along a first orthogonal direction of said lookup table;

performing a further interpolation along a second orthogonal direction of said lookup table based on results of said diagonal and another interpolations; and employing a result of said further interpolation to overdrive said liquid crystal display.

7. The method as recited in claim 6 wherein said said second orthogonal direction is normal to said first orthogonal direction.

8. The method as recited in claim 7 further comprising conducting said another interpolation using an entry in said lookup table not on a diagonal thereof and on a same side of the diagonal as an interpolation target.

9. The method as recited in claim 8 further comprising approximating any division operations by multiplication by based on three most significant bits of a division fraction as an index into a multiplication table.

10. A liquid crystal display drive system, comprising:

a graphics subsystem having a graphics processing unit and a frame buffer coupled thereto operable to store a TO gray level;

a previous frame buffer operable to store a FROM gray level; and an interpolation circuit coupled to said frame buffer and said previous frame buffer and including:

a diagonal interpolator operable to perform a diagonal interpolation along a diagonal direction in a lookup table based on said TO and FROM gray levels, and a further interpolator coupled to said diagonal interpolator and operable to perform a further interpolation based on a result of said diagonal interpolation; and another interpolator coupled to said diagonal and further interpolators.

11. The drive system as recited in claim 10 wherein said another interpolator is operable to perform another interpolation along a first orthogonal direction of said lookup table.

12. The drive system as recited in claim 11 wherein said further interpolation is an interpolation along a second orthogonal direction of said lookup table based on results of said diagonal and another interpolations, said second orthogonal direction being normal to said first orthogonal direction.

13. The drive system as recited in claim 12 wherein said another interpolation uses an entry in said lookup table not on a diagonal thereof and on the same side of the diagonal as an interpolation target point.

* * * * *